Patented Sept. 19, 1922.

1,429,550

UNITED STATES PATENT OFFICE.

LOUIS FENN VOGT, OF WASHINGTON, PENNSYLVANIA, ASSIGNOR TO STANDARD CHEMICAL COMPANY, OF PITTSBURGH, PENNSYLVANIA.

PROCESS OF ORE CONCENTRATION.

No Drawing.      Application filed January 15, 1920. Serial No. 351,632.

*To all whom it may concern:*

Be it known that I, LOUIS F. VOGT, a citizen of the United States, and a resident of Washington, in the county of Washington and State of Pennsylvania, have invented certain new and useful Improvements in Processes of Ore Concentration; and I do hereby declare the following to be a full, clear, and exact description of the invention, such as will enable others skilled in the art to which it appertains to make and use the same.

This invention relates to improvements in processes of ore concentration, and more particularly to the concentration of such ores as contain radium, uranium and vanadium.

Radium, uranium and vanadium are recovered, to a great extent, from carnotite and the ore bearing this name is generally a sand-stone in which the sand particles are cemented together by a mineral composition. The sand particles vary in size much the same as in ordinary sand and the materials which constitute a cementing binder for the sand particles contain the valuable constituents of the ore in more or less complex combinations. A certain amount of silica also exists in chemical combination with the values, together with calcium, magnesium, etc., as silicates. The ore therefore contains silica as sand and silica in combinations as silicates. The mineral portion of the ore is, in its natural state very finely comminuted and contains in addition to the values and silicates, some organic matter, moisture and clay, all of which combine to form a cement which holds the sand particles distributed through the body of ore.

It is possible to remove some of the mineral matter from the sand by grinding the ore and classification of the ground product, but such a method is not satisfactory and is in fact objectionable, because only a portion of the mineral matter is loosened from the sand grains and therefore the subsequent recovery of values will be low, and if the grinding be carried sufficiently far to loosen most of the mineral from the sand particles, the latter would be ground so fine as to escape with the concentrates during the classification step, thereby giving a very low grade product or concentrate. It is therefore evident that the best results can be obtained only when the sand grains are not themselves ground, the best results being high recovery of values in the least practical weight of concentrate.

One object of my present invention is to overcome the defects and objectionable features of processes of concentration of ore, such as carnotite ore, as heretofore practiced and to provide a process whereby a maximum quantity and grade of concentrates of the valuable constituents of the ore can be obtained.

A further object is to so concentrate ore containing radium, uranium and vanadium as to avoid breaking of the sand grains of the ore, and so as to effectually separate the sand and other gangue material from the value-bearing minerals, and further benefit the concentrates in other respects.

A further object is to provide a concentration process whereby a maximum yield of values may be obtained from a relatively minimum quantity of ore, thereby reducing to a minimum, the cost of the method of concentration.

With these and other objects in view, the invention consists in certain novel features of the method of concentrating ore as hereinafter set forth and pointed out in the claims.

In carrying out my improved process, I first roast the ore so as to heat the same to a proper temperature and for a sufficient time to de-hydrate its earthy constituents and hence increase the specific gravity of the same and also cause such earthy constituents to have such form as to readily settle when subsequently subjected to classification, while the mineral constituents containing the values will be practically an impalpable powder having comparatively low specific gravity and being in suspension will be carried or permitted to float off during the classification step whether such step be a wet or dry separation or classification step. To further explain the effect of initially roasting ore, such as carnotite, it may be stated that I have discovered that heating the ore to a proper temperature and for a suitable period, will volatilize the organic matter, water and carbon dioxide, calcine a portion of the calcium, magnesium etc., and in general so change the combination and condition of the elements contained in the mineral matter, that the cementing property of the latter will be practically destroyed.

The roasting or heating of the ore must be carried on at the best temperature and for the best length of time that the particular ore being treated demands. The temperature and time will vary somewhat according to the size of the ore lumps,—but suffice it to say that the roasting generally requires a red heat,—approximately from 1200 to 1300 degrees F., for approximately an hour, but I do not wish to limit myself to any specific temperature or the duration of heating, so long as both are sufficient to effect the destruction of the cementing bond or characteristic of the mineral matter.

After ore, such as carnotite ore, has been heated as above described, it will crumble readily, and may be permitted to cool before further treatment. I have found however, that a greater degree of disintegration takes place if the hot ore be immediately quenched in water, as by so doing the steam generated in the ore will cause a more efficient breaking up of the cementing material. It is probable also that a slacking action is caused, to some extent, analogous to the slacking of burned lime, while at the same time certain other constituents of the ore, such as clay, are so affected (formed into small particles or granules) as to prevent the same from escaping with the concentrates during subsequent classification.

After the ore shall have been roasted or heated as previously explained, I break or crumble it gently to free the mineral from the silica grains,—not by crushing and grinding as these terms are usually employed, but rather by erosion to scour the loose mineral from the sand grains. This may be accomplished in various ways; rolls may be used, or any gentle mechanical means, but I perfer to employ a rotating cylinder or cone, wherein the ore may be rotated or agitated, with water,—the ore itself accomplishing most of the erosion of the values—without material change in the physical character and size of the sand grains.

After the ore shall have been broken up as above explained, it will be classified preferably by flotation, the coarse particles comprising the sand grains and particles or granules of other portions of the ore which constitute parts of the gangue, settling in the aqueous bath if wet classification be employed, or permitted to settle by gravity if dry separation be employed, while the concentrates being in suspension will float or be carried off, and may be subsequently treated in any suitable manner for the recovery of the values.

The coarse tailing of gangue resulting from the above-described classification step may still contain some values attached to the same and may be treated in a kneading machine, or rolled wet, so that the coarse particles will scour each other and thus loosen attached mineral. The product of this kneading step may be classified—the concentrates being removed and the coarse particles settling as tailing, and these kneading and subsequent classifying steps may be repeated as often as the particular ore being treated may require to give maximum of concentrates.

I have found that the treatment of such ore as carnotite, as hereinbefore described, gives better concentrates, both as to quantity and grade, than has been obtained with concentration processes heretofore employed of which I am aware.

I have found that when the carnotite ore is roasted, the concentrates of many batches of such ore can be further improved by heating the roasted ore in water, preferably approximately to boiling point, before classification. I have also found that concentration of some batches of ore of the carnotite type can be further improved after roasting, by introducing alkalies, acids or oils into the water while eroding the ore or during the classifying steps. Caustic soda or soda ash used as above described will assist in loosening the mineral from the sand, while the use of acids will serve to dissolve off values from the sand grains, and the use of oil will facilitate the floating off of the concentrates held in suspension during the classifying steps.

Complete treatment of carnotite ore is exceptionally expensive, and this treatment cost is largely reduced by my process proportionally to the degree of concentration obtained, as it is obvious that the smaller the tonnage of material to be handled to obtain any given output of values, the lower the production cost will be. By my improved process, I am enabled to recover a maximum yield of values from a relatively minimum quantity of ore, thereby minimizing the cost of the process of concentration and at the same time reducing the ultimate total cost of the recovery of values from the ore.

Having fully described my invention what I claim as new and desire to secure by Letters-Patent, is:—

1. The process of concentrating ore of the carnotite type containing radium, uranium and vanadium, consisting in destroying the cementing function of the mineral of the ore, crumbling the ore and classifying the resultant product to recover the value-bearing constituents separated from the gangue.

2. The process of concentrating ore containing radium, uranium and vanadium, consisting in destroying the cementing function of the mineral of the ore with heat, crumbling the ore and subjecting the crumbled ore to classification to recover the value bearing constituents separated from the gangue.

3. The process of concentration of ore such as carnotite ore, consisting in roasting the ore, subsequently crumbling the roasted ore, and separating the value-bearing constituents from the gangue by causing flotation of the value-bearing portions from the heavier gangue materials.

4. The process of concentration of ore such as carnotite ore, consisting in roasting the ore, subjecting the roasted ore to a crumbling action in the presence of water, and classifying the resultant product to recover the value-bearing constituents separated from the gangue.

5. The process of concentration of ore such as carnotite ore, consisting in roasting the ore, subsequently heating the roasted ore in water to a degree approximately that of boiling point of the water, crumbling the ore and classifying the resultant product to recover the value-bearing constituents separated from the gangue.

6. The process of concentration of ore such as carnotite ore, consisting in roasting the ore, quenching the hot ore in water, crumbling the roasted and quenched ore and classifying the resultant product to recover the value-bearing constituents separated from the gangue.

7. The process of concentration of ore such as carnotite ore, consisting in roasting the ore, subjecting the roasted ore to a crumbling action, classifying the resultant product to separate most of the value-bearing constituents from the gangue, subjecting the resultant gangue to a kneading action, and classifying the resultant product to recover value-bearing constituents.

8. The process of concentration of ore such as carnotite ore, consisting in roasting the ore, crumbling the roasted ore, subjecting the crumbled ore to a classification process, and introducing into the ore after roasting a chemical agent which will facilitate removal of value-bearing material of the ore from the silica grains thereof.

In testimony whereof, I have signed this specification in the presence of two subscribing witnesses.

LOUIS FENN VOGT.

Witnesses:
ALEX McMORRAN,
C. E. HOLDER.